Dec. 31, 1929.  H. A. SCHEIDEMAN  1,742,101
GLASS GROOVING MACHINE
Filed Feb. 24, 1928   4 Sheets-Sheet 1

Inventor
Henry A. Scheideman.
By A. J. O'Brien
Attorney

Dec. 31, 1929.  H. A. SCHEIDEMAN  1,742,101
GLASS GROOVING MACHINE
Filed Feb. 24, 1928  4 Sheets-Sheet 2

Inventor
Henry A. Scheideman
By A. J. O'Brien
Attorney

Dec. 31, 1929. H. A. SCHEIDEMAN 1,742,101
GLASS GROOVING MACHINE
Filed Feb. 24, 1928 4 Sheets-Sheet 3
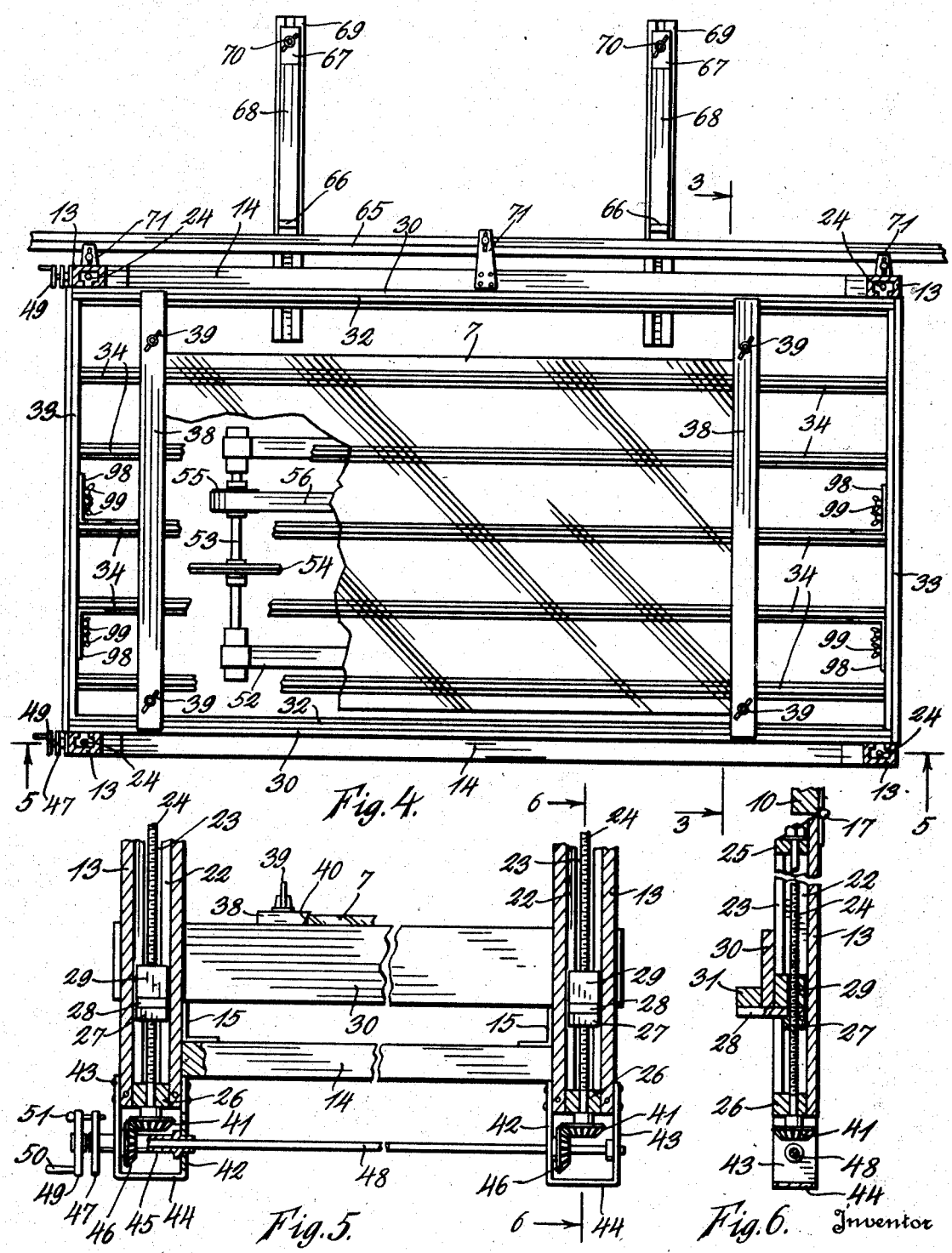
Henry A. Scheideman.
By H. J. O'Brien
Attorney

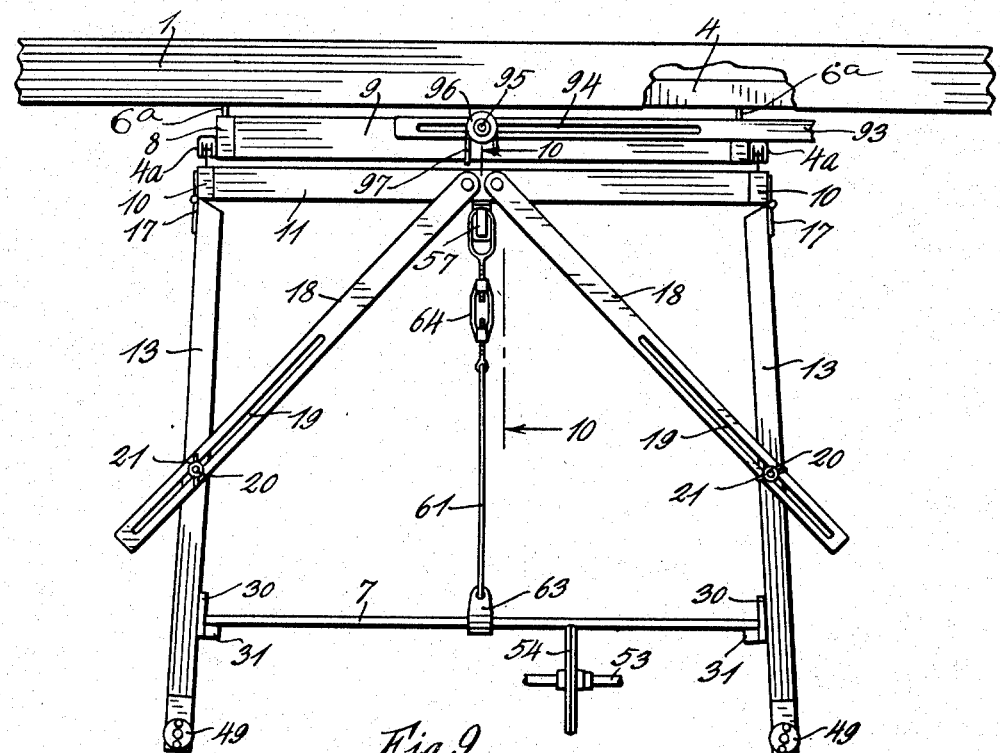
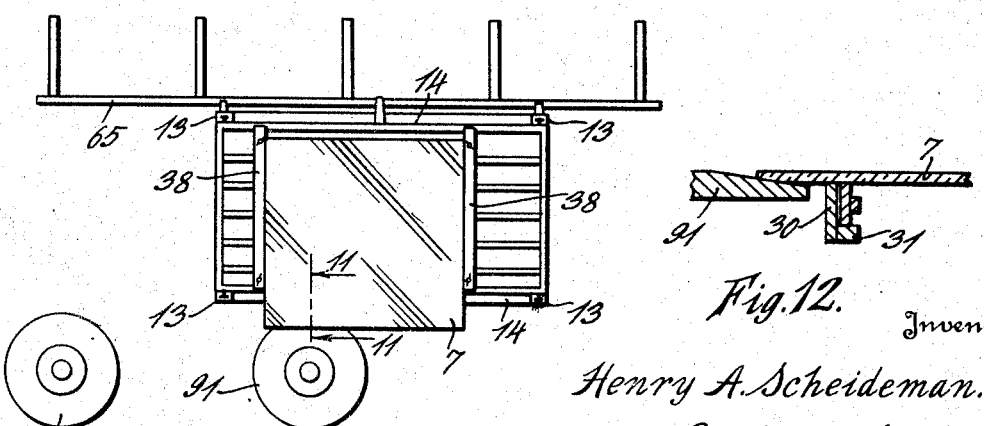

Patented Dec. 31, 1929

1,742,101

UNITED STATES PATENT OFFICE

HENRY A. SCHEIDEMAN, OF EDGEWATER, COLORADO, ASSIGNOR OF ONE-HALF TO THE McMURTRY MANUFACTURING COMPANY, OF DENVER, COLORADO, A CORPORATION OF COLORADO

GLASS-GROOVING MACHINE

Application filed February 24, 1928. Serial No. 256,548.

This invention relates to improvements in machines for use in finishing plate glass for use in connection with mirrors of the type employed in interior decorations.

It is quite customary in the manufacture of mirrors for different purposes to groove the outer surface of the mirror so as to give it a panel effect. When the glass from which the mirror is made is of considerable size, it is a very difficult proposition to make these grooves straight and of even depth by manually holding the glass against the grinding wheel and moving it along the latter in the manner in which this work is now done.

It is the object of this invention to produce a machine by means of which a piece of plate glass of any size can be supported at a proper elevation and moved in a straight line path so that when the grinding wheel is placed underneath the glass surface, and the latter properly adjusted with respect to the wheel, that perfectly straight grooves can be made in the glass by moving the supporting frame longitudinally over the wheel.

It is another object of this invention to produce a device of this type which can be easily adjusted so as to support glass plates of any size and which can be moved both in the plane of the grinding wheel and transversely to the latter, so as to facilitate the adjustment of the parts. Another object of this invention is to produce a device having supporting means for the glass plate which can be independently adjusted at each corner so as to permit the surface of the glass plate to be carefully and accurately positioned with respect to the grinding wheel.

The above and other object which may become apparent as the description proceeds are attained by means of a construction and an arrangement of parts which will now be described in detail, reference for this purpose being had to the accompanying drawings in which the preferred embodiment has been illustrated, and in which:

Fig. 4 is a plan view looking down upon the top of the plate glass along line 4—4, Fig. 1; parts being removed so as to better disclose the construction;

Fig. 5 is a section taken on line 5—5, Fig. 4;

Fig. 6 is a section taken on line 6—6, Fig. 5;

Fig. 9 is an end view of a frame showing another way of supporting the glass plate therein;

Fig. 10 is a section taken on line 10—10, Fig. 9;

Fig. 11 is plan view showing the plate in position to be acted upon by means of bevelling grinding wheels; and Fig. 12 is a section taken on line 12—12, Fig. 11.

Figure 1:
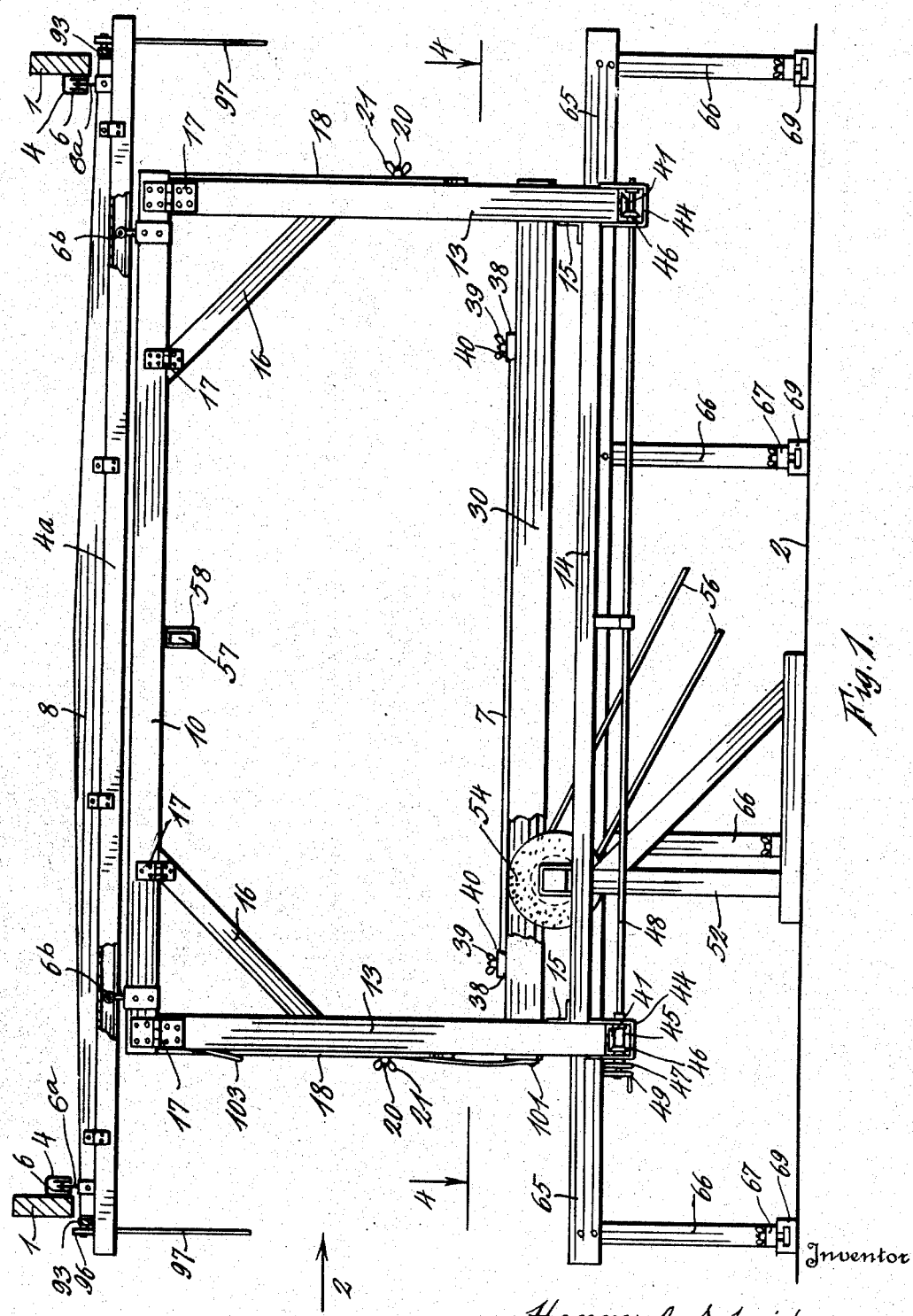
Fig. 1 is a side elevation of my improved machine; parts being broken away to better disclose the construction.

In the drawing my improved machine is shown suspended from a support comprising parallel beams 1, which are supported from the floor 2 by means of upright corner posts 3. Beams 1 may be part of the separate support or they may form part of the frame work of the building in which the machine is located. Secured to the inner surfaces of the two parallel beams 1, are tracks 4 of the kind ordinarily employed in connection with barn or garage doors. These tracks have been shown as comprising U-shaped metal members having inwardly extending flanges 5 which form tracks for the rollers 6. Supported from the rollers 6 by means of bolts 6ª, is a frame work comprising side members 8 and end members 9. Secured to the outer surface of the side member 8 are tracks 4ª, which are of the same size and shape as the tracks 4 which have been referred to above. Rollers 6ᵇ are associated with the tracks 4ª and from these is suspended a means for supporting a piece of plate glass 7. This supporting means comprises a rectangular frame having side members 10 and end members 11. The side members 10 are also connected by means of a plurality of transverse bars 12, which have been shown in section in Fig. 10. Hingedly supported from each of the side bars 10, is a frame comprising downwardly extending members 13 whose lower ends are connected by means of a bar 14. Angle brackets 15 serve to connect the bar 14 to the vertical end members 13 in the manner shown in Fig. 1. Diagonal braces 16 are secured to the vertical end members 13 and have their upper ends connected to side members 10 by means of hinges 17. It is now apparent that the frame comprising members 13 and 14 can be moved about the hinges by means of which they are connected and can therefore be made to occupy any angular position with respect to each other. Secured to each end bar 11, are two diagonal braces 18. These bars are provided with elongated slots 19 for the reception of the bolts 20 which are attached to the end members 13 and which are provided with wing nuts 21 by means of which the braces 18 may be securely clamped against relative movement with respect to members 13.

Figures 2, 3, 7, 8:
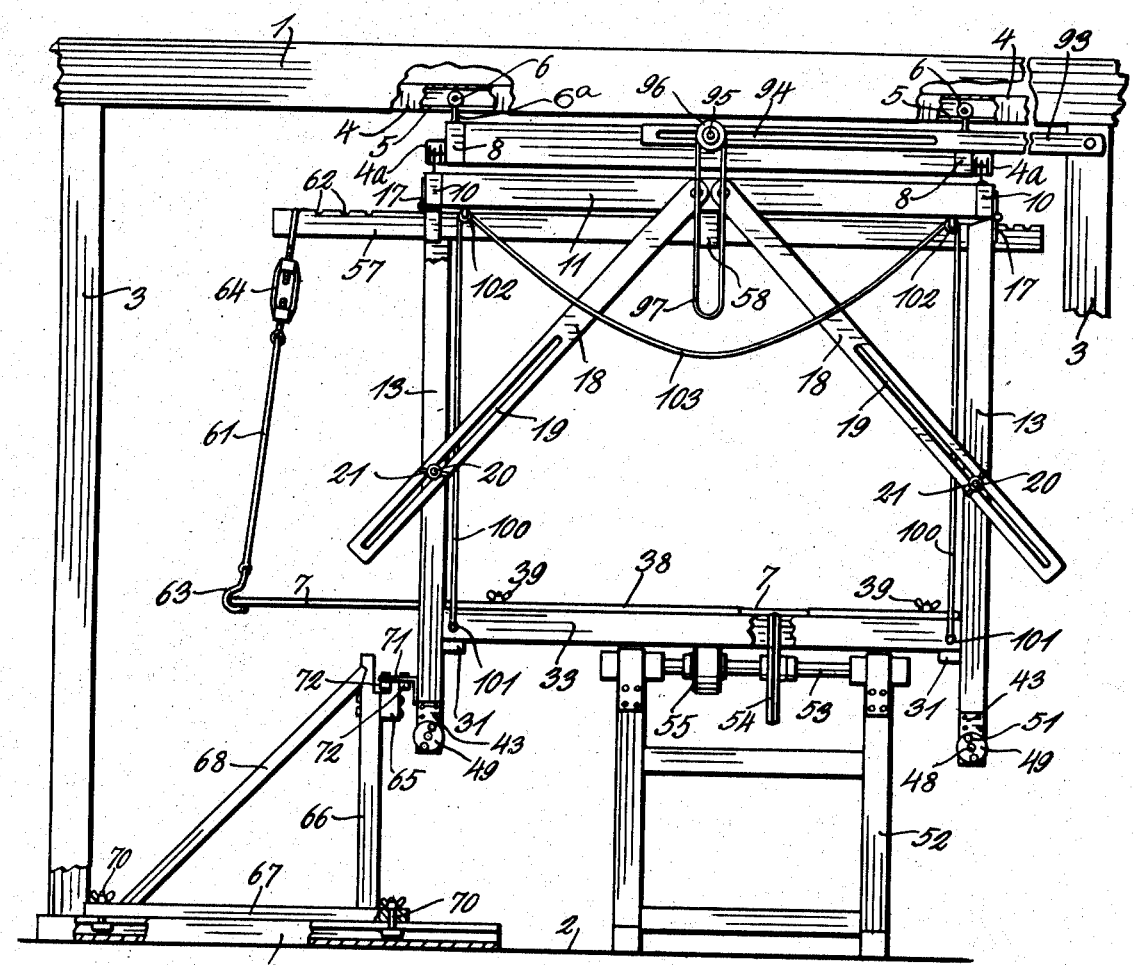
Fig. 2 is an end elevation looking in the direction of arrow 2 in Fig. 1, parts being broken away to better disclose the construction.
Fig. 3 is a section taken on line 3—3, Fig. 4.
Fig. 7 is a plan view looking down upon the plate and shows the same positioned above a grinding wheel which moves in a circle.
Fig. 8 is a side elevation of the grinding wheel shown in Fig. 7, parts being shown in section so as to better disclose the construction.

It is now apparent that the vertical supporting members comprising parts 13 and 14 may be spread apart at the bottom in the manner shown in Fig. 9; held in parallel relation in the manner shown in Fig. 2, or moved towards each other to any extent that may be required. This adjustment makes it possible to accommodate plates of glass of different width in a manner which will hereinafter be more fully described. The downwardly extending supporting members 13 are preferably provided with a rectangular opening 22 extending from one end to the other. Slots 23 extend along one side of this opening in the manner shown quite clearly in Figs. 5 and 6. Threaded rod 24 has its top and bottom journalled respectively in bearings 25 and 26. Secured to each of these threaded bars is a nut 27, which has a shape corresponding to the shape of the opening 22 and which will therefore be held against rotation. Extending outwardly through each of the slots 25 is a bracket 28, which rests upon the upper surface of the nut 27. A block 29 is secured to the inner end of each bracket and has an opening through which the rod 29 extends. The function of this block is to steady the brackets 28 with which it is connected. Resting upon the brackets 28 are side members 30 along the lower inner edge of which are secured the strips 31. This assembly comprising members 30 and 31 serves as a support for a frame work having side members 32 and end members 33. A plurality of parallel supporting bars 34 have their ends secured to the end members 33 and form with side members 32 a removable supporting frame work upon which the glass plate 7 rests. Secured to the parallel supporting member 34 are cleats 35 against which the slidable blocks 36 rest. A bolt 37 is secured to each of the blocks 36 and has its upper threaded end projecting through openings in the transverse bar 38. Wing nuts 39 cooperate with the bolts 37 for the purpose of clamping the bars 38 in place. From Fig. 1 it will be seen that one edge of each bar is bevelled in the manner indicated by reference numeral 40 and this bevelled edge is placed against the ends of the glass plate 7 and serves to clamp the latter onto the upper surface of the supporting frame.

Referring now more particularly to Figs. 5 and 6, it will be observed that a bevelled gear 41 has been secured to the lower end of each of the threaded bars 24. A U-shaped member having sides 42 and 43 and a bottom member 44 is secured to the lower end of each of the corner posts 13. A hollow shaft 45 is journalled in the sides 42 and 43 of the U-shaped members connected to the corner posts near the front end of the supporting frame. A bevel gear 46 is secured to each of these hollow shafts and cooperates with the bevel gear 41. Secured to the outer end of the hollow shafts 45 are hand wheels 47, by means of which the shaft may be rotated. It is now apparent that when the shafts 45 are rotated, they will rotate the bevel gears 41 which are secured to the corresponding bars 24 and move the nuts 27 upwardly or downwardly. A shaft 48 extends through the hollow shaft 45 and has its rear end journalled in the sides 42 and 43 of the U-shaped member secured to the post 13 at the opposite ends of the frame. This shaft carries a bevel gear 46 which meshes with the bevel gear 41 and has a hand wheel 49 secured to its forward end. This hand wheel is provided with a handle 50 which may be used in rotating the shaft. A pin 51 connects the two hand wheels 47 and 49 so that they may be rotated as a unit. When the pin 51 is removed, shafts 45 and 48 may be independently rotated whereby a separate adjustment may be had for each of the corners of the supporting frame. And in this way it is possible to adjust the position of the glass plate very accurately.

The frame comprising side members 8 is, as above described, supported from the beams 1 by means of the tracks 4 and can therefore be adjusted in the direction of beams 1. This adjustment is for convenience in getting the supporting frame properly aligned and after this has been accomplished, frame 8 may be locked in adjusted position. The frame comprising side members 10 is supported on tracks 4ª and can therefore be moved in the direction of these tracks. It is, of course, evident that tracks 4ª can be as long as may be desired so that the supporting frame may have a long range of travel. Supported upon the floor 2 is a frame work which has been designated as a whole by reference numeral 52 (Fig. 1) and this frame work carries a rotating spindle 53 to which is attached a grinding wheel 54. Shaft 53 has a pulley 55, to which the belt 56 is attached and by means of which the spindle and the grinding wheel are rotated. When the machine is in operation, the supporting frame is adjusted in such a manner that the lower surface of the plate glass rests lightly upon the grinding wheel. The grinding wheel is now rotated by means of a suitable motor after which the frame on which it is supported is moved slowly in the direction of tracks 4ᵃ. During this movement the grinding wheel cuts a shallow groove in the plate and at the end of the travel the operator can rotate shafts 45 and 48 so as to lower the plate slightly after which the frame is moved in the opposite direction. This operation is continued until the groove is cut to the desired depth. The grinding wheel may now be replaced with a polishing wheel which serves to finish the surface of the glass which forms the bottom of the groove. After one groove has been finished, the plate is moved and properly aligned for cutting the next groove. This is repeated until the glass has been paneled in the desired manner. It sometimes happens that a very wide piece of glass is to be operated upon and if this glass projects beyond the side of the supporting frame in the manner shown in Fig. 2, it is necessary to support the outer edge so as to obviate danger of breaking. For the purpose of supporting the edges of the glass, I have provided a bar 57 which extends through a loop 58 that is pivotally attached, by means of a bolt 59, to a short bar 60 that extends between the two central transverse members 12 in the manner shown in Fig. 10. A sling 61 passes over the outer end of bar 57 and rests in one of the notches 62. The ends of this sling are provided with grapple hooks 63 which engage the edges of the glass and it is also provided with turn buckles 64 which serve to adjust the length of the sling so as to give the desired support.

For the purpose of assuring a straight line motion of the supporting frame, I have provided a guide bar 65, which is supported on uprights 66 that extend upwardly from a base member 67 and are braced against lateral movement by means of a diagonal brace 68 in the manner shown in Fig. 2. A base member 67 which forms part of the triangular structure 65 is slidably connected to the guide 69 that rests upon and is secured to the floor. Bolts 70 serve to clamp the triangular structure formed by members 66, 67 and 68 in any desired position. Extending laterally from the movable frame work are brackets 71, which carry rollers 72. The rollers that are secured to the end brackets 72 engage the inner side of the guide member 65 while the roller that is secured to the center bracket 71, engages the outer side of the guide member, and serve to align the frame with respect to this guide.

In Fig. 9 I have shown the glass plate 7 supported directly on the strips 31 thereby obviating the necessity of employing the supporting frame formed by sides 32 and ends 33. When the plate is supported as shown in Fig. 9, the ends are supported by means of the sling so as to prevent sagging of the plate. This particular method of supporting is very well adapted for use in connection with plates of comparatively small size, but can also be used with larger plates. It is often necessary to cut circular channels or grooves in the glass in the manner shown in Fig. 7, and when this is to be done the manner of supporting the plate shown in Fig. 9 makes it possible to cut the circular or arcuate groove as the entire surface of the lower plate is exposed.

In Fig. 8 I have shown in a somewhat more or less diagrammatic manner a support for the grinding wheel 54 which permits it to be rotated for the purpose of cutting arcuate grooves. This support comprises a base 73 that can be secured to the floor by any suitable means, as, for example, by means of bolts 74. A shaft 75 is mounted for rotation about a vertical axis and is provided with a pulley 76 to which power is transmitted by means of the belt 77. The upper end of shaft 75 is provided with a collar 78 on which the bearing 79 rests. A bevel gear 80 is secured to the upper end of the shaft and this meshes with a bevel gear 81 that is rotatably mounted in the bearing 82. A shaft 83 is slidably connected with the gear 81 and has one end journalled in the bearing 84. This bearing is provided with a hub 85 which has a square or noncircular opening through which the guide 86 extends. The bearing can be clamped to the guide 86 by means of a set screw 87. Collars 88 located on opposite sides of bearing 84 prevent the shaft 83 from moving longitudinally in the bearing, and therefore the distance from the grinding wheel 54 to the axis of shaft 75 can be adjusted and thereby make it possible to cut grooves of different radii. For the purpose of preventing the grinding wheel from sagging, a brace 89 has been secured to the outer end of the guide 86 and is provided at its lower end with one or more rollers 90, which rest upon the surface of the floor. By placing the grinding mechanism shown in Fig. 8 underneath the plate in the manner shown in Fig. 7 and rotating the parts about the axis of shaft 75, circles or arcuate grooves may be cut.

In Figs. 11 and 12, I have shown how my machine can be employed for the purpose of bevelling the edges of the plate glass. When employed for this purpose the plate 7 is adjusted so as to project over the side of the supporting frame in the manner shown. A series of grinding wheels 91 and 92 is arranged along side of the machine and is located at such a height that the plate glass can be adjusted so as to bring its outer edge in contact with the grinding surface in the manner shown in Fig. 12. The frame on which the glass is supported can be adjusted by means of the mechanism already described so as to make any desired angle and in this way the width of the bevel can be accurately determined. The grinding wheels can be placed far enough apart so that the entire operation can be finished on one grinding wheel before plate is subjected to operation on the next grinding wheel, and in this manner the entire operation, including the polishing can be accomplished with one adjustment of the plate.

In Fig. 9 I have shown a bar 93 which is provided with an elongated slot 94. A bolt 95 has one end secured to the end member 9 and is provided with a nut 96 which can be rotated by means of an endless chain 97, for the purpose of clamping the frame in adjusted position along tracks 4.

Referring now more particularly to Fig. 4 it will be observed that two of the supporting bars 34 are provided at opposite ends with angular brackets 98 by means of which they are supported to the end members 33. That part of the bracket that lies adjacent to the end members 33 is provided with a slot for the reception of clamping bolts. These bolts are provided with wing nuts 99 by means of which the bars can be tightened in adjusted position. This arrangement makes it possible to move two of the bars closer together for the purpose of supporting narrow strips of glass and for the purpose of supporting the glass when a groove is to be cut very close to the edge.

In Fig. 2 I have shown a rope 100 whose ends are secured to one of the end members 33 at 101. This rope passes over pulleys 102 and by means of it the operator can grasp the center part of the rope at 103 and lift the frame on which the plate glass is supported. This is a great convenience in raising the frame so as to pass it over the grinding wheel.

From the above description it will be apparent that I have produced a machine by means of which large plates of glass can be supported in position above a grinding wheel and moved in a straight line for the purpose of grooving the plate or for the purpose of bevelling the edges. By means of this machine it is possible to make grooves that are perfectly straight and of even depth, regardless of the length of the plate. As the plates are supported on a rigid frame, they are not subjected to any strains that will tend to break them, and therefore loss due to breakage is greatly diminshed. By means of my machine it is possible for one or two men to panel very large plates which would otherwise require the service of a large number of men, and therefore a large saving is effected in the cost of labor.

I want to call particular attention to the fact that in the construction of the machine above described the glass is located above the grinding wheel. This possesses several advantages over machines of this type in which the grinding wheel is located above the glass. Among these advantages I desire to call particular attention to the fact that when the glass is located above the grinding wheel, the operation is clearly visible at all times and the operator can therefore see that the grooves are cut exactly in the desired position, besides this, the frame can be easily raised and lowered so as to absolutely determine the depth of the groove. There are also other advantages in this construction which will not be mentioned as the advantages above pointed out are obvious and of great importance.

Having described my invention what I claim as new is:

1. A glass grooving machine comprising, in combination, a support having two spaced parallel tracks, means suspended from and movably attached to the tracks for supporting a piece of plate glass, means for adjusting each corner of the glass independently of the others, a grinding wheel supported a fixed distance below the tracks and means for adjusting the position of the glass supporting means transversely with respect to the plane of the wheel and vertically with respect to the axis of the wheel.

2. A device of the class described, comprising, in combination, a support, a frame, means for attaching the frame to the support so that it will move in a rectilinear path, means suspended from the underside of the frame work for supporting a glass plate and means for fastening the glass plate to the supporting means.

3. A device of the class described, comprising, in combination, a support, a frame, means for attaching the frame to the support so that it will move in a rectilinear path, means suspended from the underside of the framework for supporting a glass plate, means for fastening the glass plate to the supporting means, means for independently adjusting the glass plate at four different points and means for raising one end of the supporting means without raising the other end.

4. A device of the class described, comprising, in combination, a support, a frame work, means for slidably connecting the frame work to the support so that it may be moved along a straight line, means suspended from the frame work for supporting a glass plate, means for adjusting the position of the plate supporting means in a vertical direction, and means for moving the frame with respect to the support, in a direction transverse to the normal line of movement.

5. A device of the class described, comprising, in combination, a support having two spaced parallel tracks, a frame work suspended from the tracks by means that permits it to be moved longitudinally along the tracks, means suspended from the frame work for supporting a plate of glass, a grinding wheel located beneath the glass plate and means for adjusting the position of the plate supporting means both vertically and horizontally with respect to the grinding wheel.

6. A device of the class described, comprising, in combination, a support having two spaced parallel tracks, a frame work suspended from the tracks by means that permits it to be moved longitudinally along the tracks, a pair of tracks secured to the frame work, said last named tracks extending transversely of the first mentioned tracks, means suspended from the transversely extending tracks for supporting a glass plate, and means for clamping the parts against movement along the first mentioned track.

7. A device of the class described, comprising, in combination, a support having two spaced parallel tracks, a frame work suspended from the tracks by means that permits it to be moved longitudinally along the tracks, a pair of tracks secured to the under side of the frame work, said last named tracks extending transversely of the first mentioned tracks, means secured to the transversely extending tracks for supporting a glass plate, means for adjusting the position of the plate in a vertical direction, and means for clamping the framework in any desired position along the first mentioned track.

8. A machine of the class described comprising, in combination, a support, a pair of spaced parallel tracks secured to the support, a frame suspended from said tracks by means that permits it to be moved along the tracks, means for holding the framework in adjusted position along the track, a pair of spaced parallel tracks secured to the frame, said last named tracks extending transversely of the first mentioned tracks, a pair of spaced parallel frames hingedly connected at their tops to the movable frame, said hinged frames having means for supporting a glass plate and means for adjusting the position of the supporting means in a vertical direction.

9. A machine of the class described comprising, in combination, a support, a pair of spaced parallel tracks, a frame suspended from said tracks by means that permits it to be moved along the tracks, a pair of spaced parallel tracks secured to the frame, said last named tracks extending transversely of the first mentioned tracks, a pair of spaced parallel frames hingedly connected to the movable frame, said hinged frames each having two spaced supports and means for independently adjusting the position of said supports.

10. A machine of the class described comprising, in combination, a support, a pair of spaced parallel tracks, a frame suspended from said tracks by means that permits it to be moved along the tracks, a pair of spaced parallel tracks secured to the frame, said last named tracks extending transversely of the first mentioned tracks, a pair of spaced parallel frames hingedly connected to the movable frame, means for bracing the hinged frames and for clamping them against movement with respect to the movable frame, two supporting brackets secured to each of the hinged frames and means for adjusting each bracket separately.

11. A device of the class described comprising, in combination, a support, a pair of spaced tracks secured to the support, a frame suspended from the tracks by means which permits it to be moved longitudinally along the tracks, means for clamping the frame against movement with respect to the tracks, a pair of spaced tracks connected to the frame and means movably connected with the last named tracks for supporting a piece of plate glass.

12. A device for supporting a piece of plate glass comprising a frame, means for supporting the frame so that it can be moved independently in two directions, a glass supporting device carried by the frame, a guide bar and means for movably connecting the glass supporting device with the guide bar.

In testimony whereof I affix my signature.

HENRY A. SCHEIDEMAN.